Dec. 19, 1933.　　　　S. MADSEN　　　　1,940,000
MITER JOINT
Filed July 29, 1932
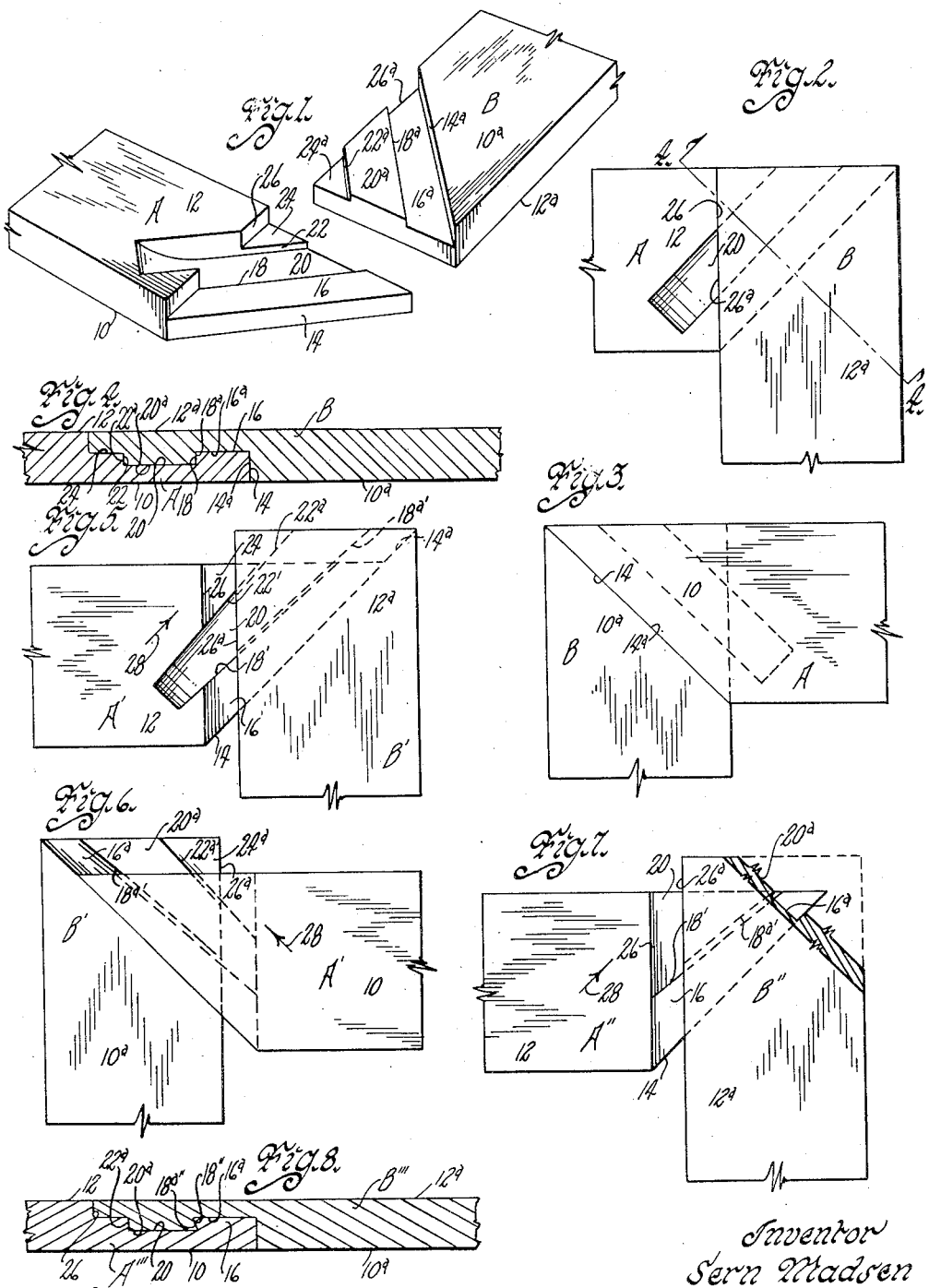
Inventor
Sern Madsen
by Bair, Freeman & Sinclair
Attorneys
Witness
Edw. Seeley Patented Dec. 19, 1933

1,940,000

UNITED STATES PATENT OFFICE 1,940,000

MITER JOINT

Sern Madsen, Clinton, Iowa, assignor to George L. Curtis, Eugene J. Curtis, and Charles A. Armstrong, all of Clinton, Iowa Application July 29, 1932. Serial No. 625,825

7 Claims. (Cl. 20—92)

An object of my invention is to provide a miter joint in which all parts of the joint are integral with the members joined by the joint and locked relative to each other, the construction being comparatively simple and inexpensive to manufacture.

A further object is to provide a joint which assures definite and positive true face relationship of the members joined by the joint.

Still a further object is to provide a joint for two wood members in which the grain of the two members extend across each other so that shrink and swell of the interlocking parts insures a balance which reduces the chance of the joint opening up.

Still a further object is to provide between two members, a lap joint formed by rabbeting the ends of the members with the engaging edges on one face of the members being apparently miter fashion and with the engaging edges on the other face of the members being apparently a butt joint, the rabbets having meeting faces of substantial area for connection with each other.

Still a further object is to provide a tongue on one of the meeting faces and a groove in the other one which may be tapered if desired to tighten the joint when the rabbeted faces are slid across each other to assembled position.

Still another object is to undercut one or more edges of the tongue and groove to prevent separation of the meeting faces of the rabbets.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a perspective view of a pair of members rabbeted, tongued and grooved to form the joint embodying my invention.

Figure 2 is a rear elevation of the two members when assembled together.

Figure 3 is a front face elevation of the same.

Figure 4 is a sectional view on the line 4—4 of Figure 2 showing the parts on an enlarged scale.

Figure 5 is a rear face elevation of a pair of members being assembled together, the joint being slightly modified when compared with the joint of Figure 2.

Figure 6 is a view similar to Figure 3 showing the modified joint of Figure 5 being assembled.

Figure 7 is a view similar to Figure 5 showing another modified form; and

Figure 8 is a sectional view similar to Figure 4 showing an undercut tongue and groove instead of the straight sided type of Figure 4.

On the accompanying drawing, I have used the reference characters A and B to indicate a pair of members to be joined together. These may be the corner of a picture frame, plain casings of a window as disclosed, or may be of ornamental molded shape as desired. It is my intention that the joint I disclose should be used with any pair of members ordinarily joined with a miter joint.

The member A has a front face 10 and a back face 12. The end of the member A, as indicated at 14, constitutes a miter edge. This is ordinarily formed at an angle of forty-five degrees, but can be formed at any other angle. For instance, a six sided frame can be made and the angle would then be sixty degrees instead of forty-five and so on.

The end of the member A is rabbeted to form faces 16 and 24 and a shoulder 26. A groove is cut in the faces 16 and 24 and is indicated by the reference numerals 18 and 22 for its sides and 20 for its bottom. It will be noted that the groove extends completely across the rabbet faces 16 and 24 and beyond the shoulder 26. Such extension is for the convenience of machining the groove. The groove is arranged substantially parallel with the miter edge 14.

The member B is also rabbeted with a shoulder 14a constituting a miter shoulder. Surfaces 16a, 20a and 24a are provided for coaction with the surfaces 16, 20 and 24 respectively of the member A. The shoulder 14a coacts with the end edge 14. The groove sides 18 and 20 of the member A coact with tongue sides 18a and 22a of the member B. The member B has a front face 10a and a rear face 12a which when the parts are assembled are in the same plane as the faces 10 and 12, respectively, of the member A. The member B has a side edge 26a adapted to contact with the shoulder 26.

The parts are shown separated in Figure 1 and in such position that the member B can be turned over, its upper right end being swung upwardly and then toward the lower left of the figure for the proper coaction of the various joint parts of the member B with the joint parts of the member A. The parts will then be in the position of Figure 2 and the shoulder 26 and the side edge 26a will apparently be a butt joint.

Viewing the opposite faces of the members, there is apparently a miter joint between the end 14 and the shoulder 14a. It can be seen in Figure 4 how the parts coact with each other and when the rabbet faces and the tongue and groove parts are glued together, it will be obvious that there are substantial surfaces between which the glue acts as a holding agent.

In Figures 5 and 6 I have shown members A' and B' which have all the parts of the members A and B except that the sides 18', 22', 18a' and 22a' are tapered. All other parts bear the same reference numerals as in Figure 1. When the member A' is moved in the direction of the arrow 28, the parts will tighten relative to each other because of the taper and the joint should be machined accurately so that when the edge 26a and the shoulder 26 engage each other, the inside and outside corners of the members A' and B' will be accurately coincident.

In the types of joints thus far described, the groove 20 extends beyond the shoulder 26. This is objectionable if it is desirable to have a neat appearing joint on both sides of the members A and B. In Figure 7 I have shown members A'' and B'' having the parts 14, 16, 18', 20 and 26, but omitting the parts 20, 22 and 24 and the corresponding parts of the member B''. The edges 18' and 18a' are tapered, the same as in Figure 5 for tightening the joint. This type of joint is a little more difficult to machine but has a better finished appearance on the back faces 12 and 12a.

In Figure 8 I have shown the same type of joint as in Figure 4 except the edges 18'' and 18a'' are undercut. This prevents separation of the meeting faces of the rabbets and serves more effectively to hold the joint together.

My joint does not require hardware, splines, clamps or any extra parts to buy or apply. The tapered type of joint draws the miter joint tightly together as the two members are assembled and a positive stop to sliding assembly is provided by the shoulder 26. When the parts are machined accurately, there is a true miter at all shoulders and on all molded surfaces. The tongue and groove construction is of such character that there is a maximum strength of wood due to large area to overcome shear strains.

With large surface contact for the glue in the joint, no clamps or nails are required to hold the joint while the glue sets and there is much more assurance that the glue will not loosen. Even when the joint is assembled without glue and nails are used to hold it in place, it should not open up. The dovetailed arrangement of Figure 8 is a further aid in holding the joint together.

The companion members of the joint can be cut for interchangeability and need not be machined while assembled with companion parts adjoining. The inside and outside edges of the joined members are not cut away or marred but are left in full section and smooth in appearance when they are assembled.

Furthermore, no special tools are required for the assembly. The rabbeted and overlapping construction of the joint resists opening of the joint on account of shrink and swell of wood parts and by the use of the tongue and groove construction, the tendency for miter edges to be forced against each other and displaced when the wood swells is eliminated. The joint can readily be made in even thin pieces of wood wherein it will be equally as effective as in thick pieces. The overlapping and rabbeted construction is much superior to miter edge joints now used, especially when the material joined is thin.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A pair of members extending at an angle relative to each other and having rabbeted ends to interfit with each other, the end of one of said members constituting a miter edge and a shoulder of the rabbet of the other member constituting a miter shoulder to fit thereagainst, the meeting face of one of said rabbets having a tongue and the meeting face of the other of said rabbets having a groove to interfit therewith, said tongue and groove extending in a direction substantially equiangular relative to the length of each of said members.

2. A pair of members extending at an angle relative to each other and having rabbeted ends to interfit with each other, the end of one of said members constituting a miter edge and a shoulder of the rabbet of the other member constituting a miter shoulder to fit thereagainst, the meeting face of one of said rabbets having a tongue and the meeting face of the other of said rabbets having a groove to interfit therewith, said tongue and groove being tapered for tightening of the joint therebetween when the members are retained in the same plane and slid relative to each other to assembled position.

3. A pair of members extending at an angle relative to each other and having rabbeted ends to interfit with each other, the end of one of said members constituting a miter edge and a shoulder of the rabbet of the other member constituting a miter shoulder to fit thereagainst, the meeting face of one of said rabbets having a tongue and the meeting face of the other of said rabbets having a groove to interfit therewith, said tongue and groove being tapered with the taper diverging toward the inner end of said miter shoulder.

4. A pair of members extending at an angle relative to each other and having rabbeted ends to interfit with each other, the end of one of said members constituting a miter edge and a shoulder of the rabbet of the other member constituting a miter shoulder to fit thereagainst, the meeting face of one of said rabbets having a tongue and the meeting face of the other of said rabbets having a groove to interfit therewith, at least one edge of said tongue and of said groove being undercut to prevent separation of said meeting faces.

5. A pair of members extending at an angle relative to each other and having rabbeted ends to interfit with each other, the end of one of said members constituting a miter edge and a shoulder of the rabbet of the other member constituting a miter shoulder to fit thereagainst, the meeting face of the rabbet of the first member having a groove and the meeting face of the other of said rabbets having a tongue to interfit therewith, said tongue and groove being tapered with the taper converging toward the shoulder of the rabbet of the first mentioned member, said groove extending beyond said last mentioned shoulder.

6. A pair of members extending at an angle relative to each other and having rabbeted ends to interfit with each other, the end of one of said members constituting a miter edge and a shoulder of the rabbet of the other member constituting a miter shoulder to fit thereagainst, the meeting face of one of said rabbets having a tongue and the meeting face of the other of said rabbets having a groove to interfit therewith, said tongue and groove being tapered for tightening of the joint therebetween when the members are retained in the same plane and slid relative to each other to assembled position, at least one edge of said tongue and of said groove being undercut to prevent separation of said meeting faces.

7. An angle joint construction between two members having mutually overlapping rabbeted ends, the lapping surfaces being substantially in the plane of the members and intermediate the two faces thereof, a joint appearing on one face between a miter end of the first member and a mitered rabbet shoulder of the second member and on the other face a joint appearing between an edge of the second member and a coacting rabbet shoulder of the first member, and on the lapping surfaces a tongue and a groove coacting with each other and both formed at an angle substantially parallel to the bisecting angle between the two members for holding the lapping surfaces joined in closed assembled relationship.

SERN MADSEN.